United States Patent
Ohtomo et al.

(10) Patent No.: US 7,177,016 B2
(45) Date of Patent: Feb. 13, 2007

(54) ELECTRONIC SURVEYING APPARATUS

(75) Inventors: Fumio Ohtomo, Tokyo (JP); Ritsuo Sakimura, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 178 days.

(21) Appl. No.: 10/824,234

(22) Filed: Apr. 14, 2004

(65) Prior Publication Data
US 2004/0246468 A1 Dec. 9, 2004

(30) Foreign Application Priority Data
Apr. 14, 2003 (JP) ............................. 2003-108872
Jun. 10, 2003 (JP) ............................. 2003-165467

(51) Int. Cl.
*G01J 5/48* (2006.01)
(52) U.S. Cl. ....................................................... 356/43
(58) Field of Classification Search .................. 356/43
See application file for complete search history.

(56) References Cited

U.S. PATENT DOCUMENTS

| 5,100,229 A | * | 3/1992 | Lundberg et al. .......... 356/3.12 |
| 5,671,160 A | * | 9/1997 | Julian .......................... 702/94 |
| 6,229,598 B1 | * | 5/2001 | Yoshida ..................... 356/5.01 |
| 2003/0090646 A1 | * | 5/2003 | Riegl et al. .................... 356/3 |
| 2003/0121673 A1 | * | 7/2003 | Kacyra et al. ................. 172/1 |

FOREIGN PATENT DOCUMENTS

JP  2002-202126  7/2002

* cited by examiner

Primary Examiner—Thomas H. Tarcza
Assistant Examiner—Luke D. Ratcliffe
(74) Attorney, Agent, or Firm—Chapman and Cutler LLP

(57) ABSTRACT

An electronically surveying apparatus of the present invention includes a storing portion for storing positional information of a surveying apparatus body and design data; an angle-measuring portion for electronically measuring an angle between a reference direction and an aimed direction; an arithmetic processing portion for obtaining a model of an expected arrangement at completion of an object which is expected to be seen from the surveying apparatus body in the aimed direction by calculation, based on the angle measured by the angle-measuring portion and the design data; and a displaying portion for displaying the model of the expected arrangement at completion of the object.

17 Claims, 5 Drawing Sheets

ELECTRONIC SURVEYING APPARATUS

BACKGROUND OF THE INVENTION

1. Field of the Invention

The present invention relates to an electronically surveying apparatus capable of displaying a model of an object which is expected to be arranged at completion (expected arrangement at completion of an object) of, for example, engineering works, on a display screen based on design data.

2. Description of the Related Art

Heretofore, there has been known an electronically surveying apparatus, for example, as disclosed in JP-A 2002-202126, which is provided with a telescope portion for viewing an object to be measured, an imaging portion for imaging the measurement object viewed by the telescope portion, a displaying portion for displaying the measurement object imaged by the imaging portion on a screen as a real image, and a storing portion for storing design data which correspond to the measurement object.

Meanwhile, engineering works such as a civil engineering are carried out based on design data. For example, based on the design data, roads are constructed and finished to be in a predetermined configuration by building of an embankment and performing of cutting in a roadwork, and groundwork and construction of a building are carried out in a construction work. In these engineering works, surveying data are collected while viewing the measurement object with the telescope portion of the electronically surveying apparatus, and the collected surveying data and the design data are then compared in every management point to confirm whether or not the work is carried out according to the design data, in mid-course of an operation of the work. However, the management points do not necessarily represent the design data.

In addition, it takes a too long surveying time to judge whether or not the work is carried out according to a construction plan by comparing the surveyed data with the design data in every management point, and thus not only the surveying operation is cumbersome, but also it causes the work to be delayed.

Furthermore, it is difficult to image a positional relationship between an arrangement of an object according to a design and that of an object in an actual condition, since an existing building or a mark which becomes as a standard is not constructed in an early stage of the construction. Particularly, installing of slope stakes takes a long time and thus they cannot be piled efficiently, if a completed form of the object has not been imaged. Accordingly, a skilled worker such as a stake-installation craftworker is required for installing the stakes.

SUMMARY OF THE INVENTION

The present invention has been made in view of the above-mentioned problems. Therefore, it is an object of the present invention to provide an electronically surveying apparatus capable of confirming visually whether or not an object to be measured is constructed according to design data.

To accomplish the above mentioned object, an electronically surveying apparatus according to a first aspect of the present invention comprises a storing portion for storing positions information of a surveying apparatus body and design data; an angle-measuring portion for electronically measuring an angle between a reference direction and an aimed direction; an arithmetic processing portion for obtaining a model of an expected arrangement at completion of an object which is expected to be seen from the surveying apparatus body in the aimed direction by calculation, based on the angle measured by the angle-measuring portion and the design data; and a displaying portion for displaying the model of the expected arrangement at completion of the object.

An electronically surveying apparatus according to a second aspect of the present invention comprises a telescope portion for viewing an object to be measured; an imaging portion for imaging the measurement object viewed by the telescope portion; a displaying portion capable of displaying the measurement object imaged by the imaging portion as a real image of the measurement object; a storing portion for storing design data which corresponds to the measurement object; an angle-measuring portion for electronically measuring an angle between a reference direction and a viewing direction; and an arithmetic processing portion for obtaining a model of an expected arrangement at completion of an object which is expected to be seen in the viewing direction by calculation, based on the angle measured by the angle-measuring portion and the design data, wherein the model of the expected arrangement at completion of the object is configured to be displayed on the displaying portion, directly or by being overlapped with the real image.

DESCRIPTION OF THE PREFERRED EMBODIMENT

Figure 1:
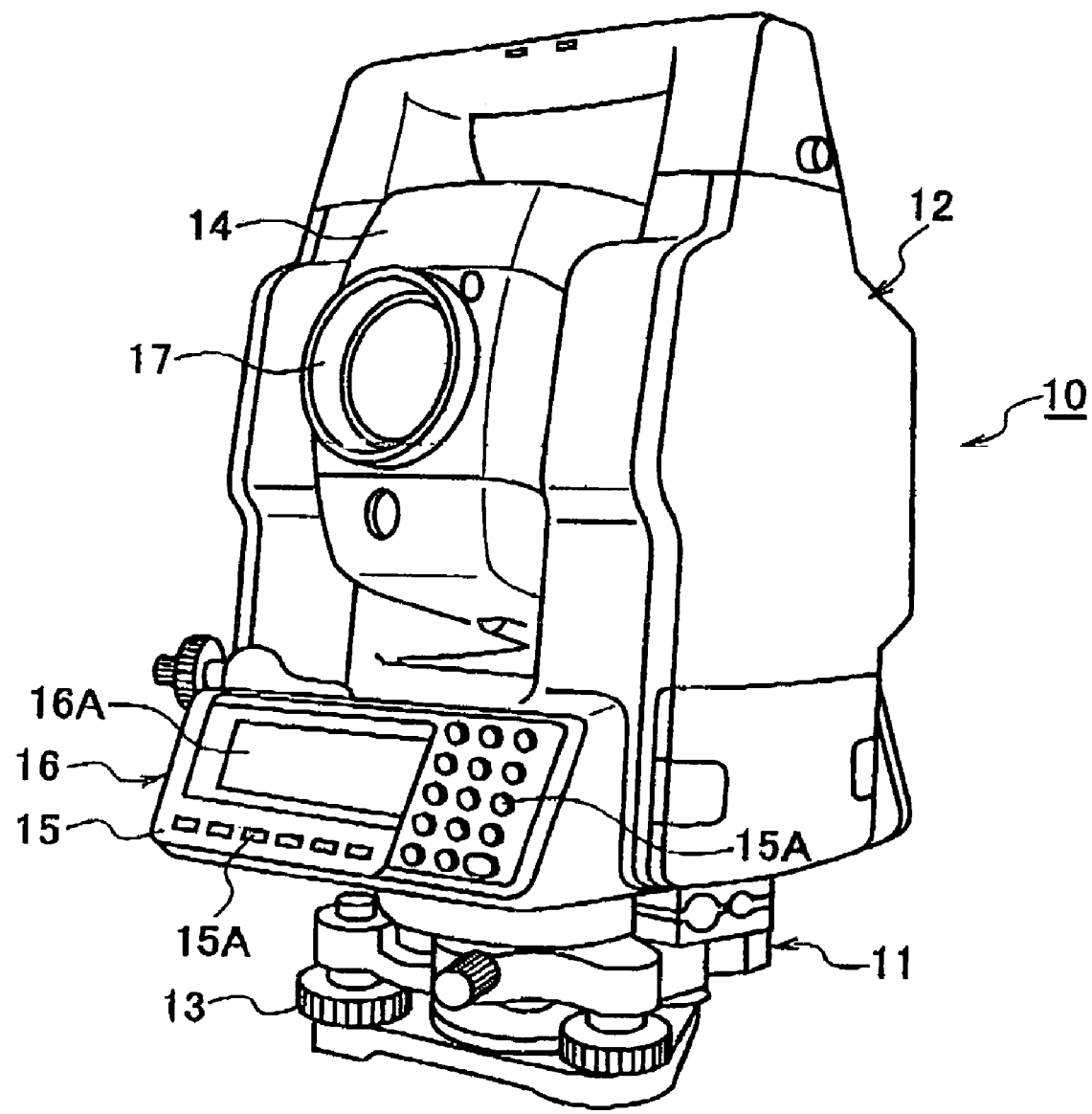
FIG. 1 is a schematic diagram showing one embodiment of an electronically surveying apparatus according to the present invention.

Referring to FIG. 1, reference sign 10 denotes an electronically surveying apparatus. The electronically surveying apparatus 10 includes a base portion 11 and a support-standing portion 12 which are as a surveying apparatus body. The base portion 11 can be attached to a tripod, which is not shown, via leveling plates 13.

The base portion 11 rotatably supports the support-standing portion 12 such that the support-standing portion is rotated horizontally. A supporting portion of the support-standing portion 12 supports a telescope portion 14 rotatably in a vertical direction. A lower part of the support-standing portion 12 is provided with an operation/input panel 15 as an operation/input portion and a display 16 as a displaying portion for displaying, such as, measurement data, etc. The telescope portion 14 has an objective lens 17, and the operation/input panel 15 is provided with an operation/input button 15A.

Figure 2:
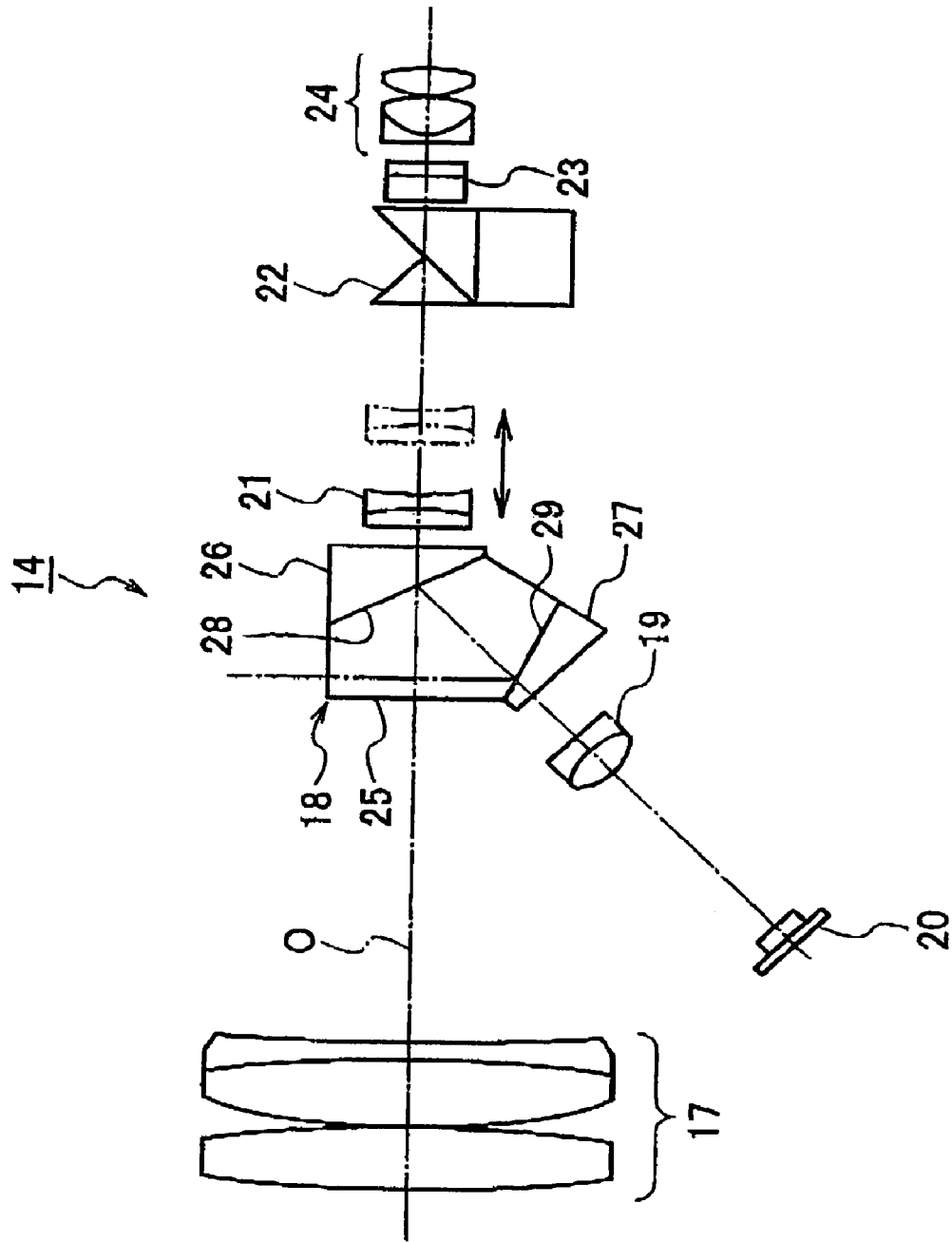
FIG. 2 is a diagram showing an optical system of one embodiment of the electronically surveying apparatus according to the present invention.

An optical system shown in FIG. 2 is mounted inside of the telescope portion 14. In FIG. 2, reference sign O denotes an optical axis of the telescope portion 14. In the telescope portion 14, a dichroic prism 18, a condenser lens 19, an image sensor 20 as an imaging portion, a focusing lens 21, a porro prism 22, a focal plane plate 23, and an ocular lens 24 are provided, rearward of the objective lens 17.

The dichroic prism 18 includes a first prism 25, a second prism 26 and a third prism 27. A first dichroic mirror 28 is formed between the first prism 25 and the second prism 26, and a second dichroic mirror 29 is formed between the first prism 25 and the third prism 27.

Light entering the telescope portion 14 through the objective lens 17 goes to the dichroic prism 18. Measurement light and a part of visible light are reflected by the first dichroic mirror 28, and that part of the visible light forms an image on the image sensor 20 through the condenser lens 19. The second dichroic mirror 29 reflects the measurement light only, and the reflected measurement light is then introduced to a ranging portion 31 which will be described later.

The visible light transmitted through the first dichroic mirror 28 forms an image on the focal plane plate 23 through the focusing lens 21 and the porro prism 22, so that an object to be measured, which will be described later, is viewed by looking into the telescope portion 14 through the ocular lens 24.

Figure 3:
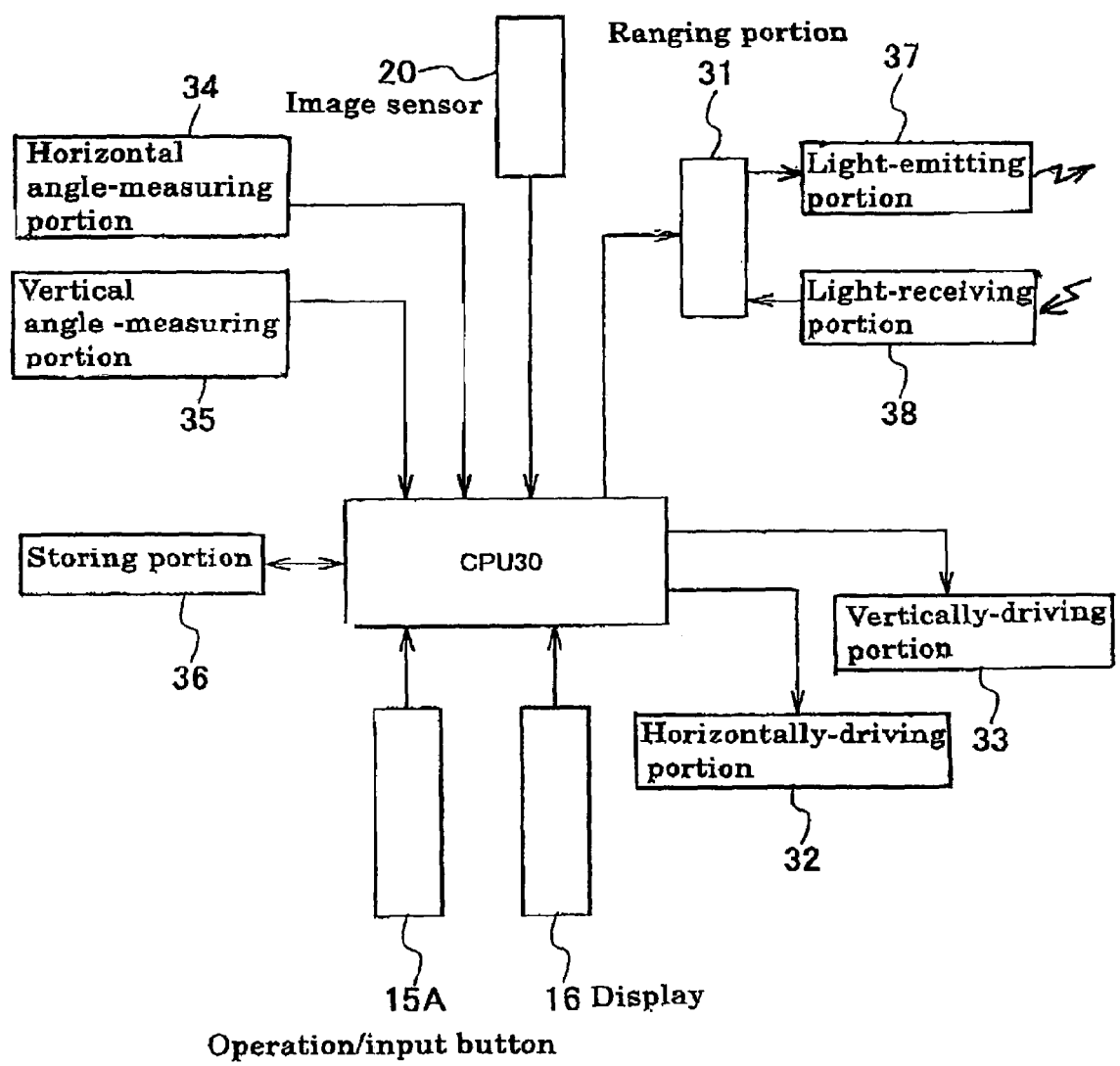
FIG. 3 is a block diagram showing a circuit of the electronically surveying apparatus according to the present invention.

Upon receiving of the part of the visible light, the image sensor 20 outputs a signal corresponding to the received visible light as a picture signal into a CPU 30 as shown in FIG. 3. The CPU 30 functions as an arithmetic processing portion which will be described later. The CPU 30 processes the measurement object imaged by the image sensor 20 so as to create an image thereof, and displays the created image of the measurement object on a screen 16A of the display 16.

As shown in FIG. 3, the ranging portion 31, a horizontally-driving portion 32, a vertically-driving portion 33, a horizontal angle-measuring portion 34, a vertical angle-measuring portion 35, and a storing portion 36 are provided inside of the surveying machine body.

The ranging portion 31 drives a light-emitting portion 37 based on a control command from the CPU 30 to allow the light-emitting portion to emit ranging light, and a light-receiving portion 38 receives the ranging light reflected by the measurement object, which will be described later, thereby to measure a distance from the electronically surveying apparatus 10 to the measurement object. For example, a light-wave distance meter (electronic distance meter) in a laser type is used for the ranging portion 31.

The horizontally-driving portion 32 drives the support-standing portion 12 to be rotated horizontally based on the control command from the CPU 30, and the vertically-driving portion 33 drives the telescope portion 14 to be rotated in the vertical direction based on the control command from the CPU 30. Since it is well-known that the driving mechanism is constructed by a motor or the like, explanation thereon is omitted here.

Each of the horizontal angle-measuring portion 34 and the vertical angle-measuring portion 35 are constructed by an encoder including well-known rotor and stator. An angle in a horizontal direction is measured by the horizontal angle-measuring portion 34, and an angle in the vertical direction is determined by the vertical angle-measuring portion 35.

Figure 4:
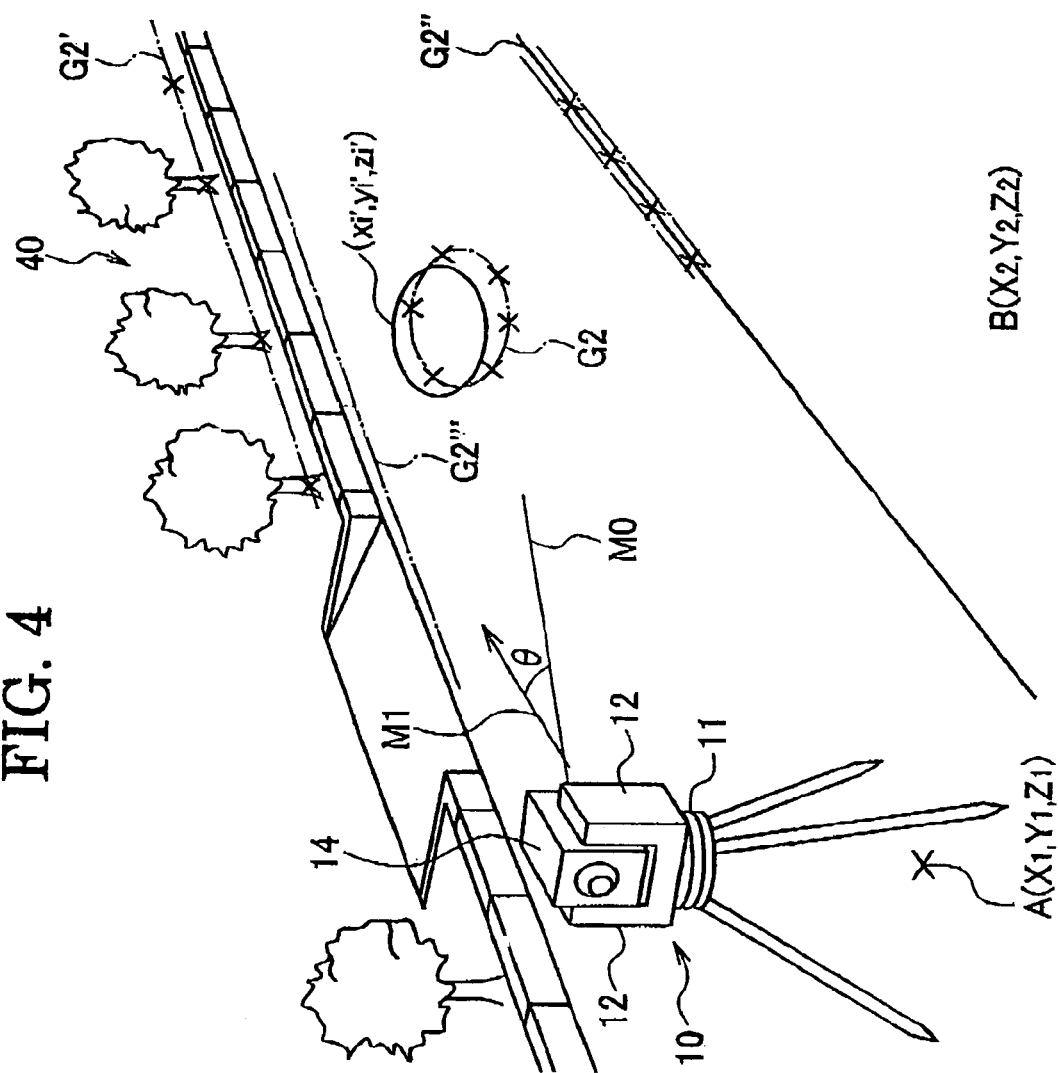
FIG. 4 is a diagram schematically showing a relationship between the electronically surveying apparatus for viewing an object to be measured and the measurement object.

As shown in FIG. 4, the electronically surveying apparatus 10 is set at a known point A (X1, Y1, Z1) in relation to a control point B (X2, Y2, Z2). The known point A (X1, Y1, Z1) may be found by using a GPS (Global Positioning System) device which is not shown.

Meanwhile, in FIG. 4, reference sign 40 represents scenery which is in the vicinity of a road under construction, as the measurement object. It can be seen from FIG. 4 that trees are planted along a roadside while being spaced from each other at a certain distance, and a manhole is located at center of the road.

Also, reference sign "X" represents design data, reference sign G2 represents a model of the manhole as an object which is expected to be arranged at completion, reference sign G2' represents a model of tree-planted points as an object expected to be arranged at completion, reference sign G2" represents a model of a road-edge as an object expected to be arranged at completion, and reference sign G2'" represents a lower edge of blocks as an object expected to be arranged at completion.

The horizontal angle-measuring portion 34 and the vertical angle-measuring portion 35 operate as an angle-measuring portion for measuring and calculating an angle $\theta$ between a reference direction M0 and a viewing direction (aimed direction) M1, as shown in FIG. 4.

Figure 5:
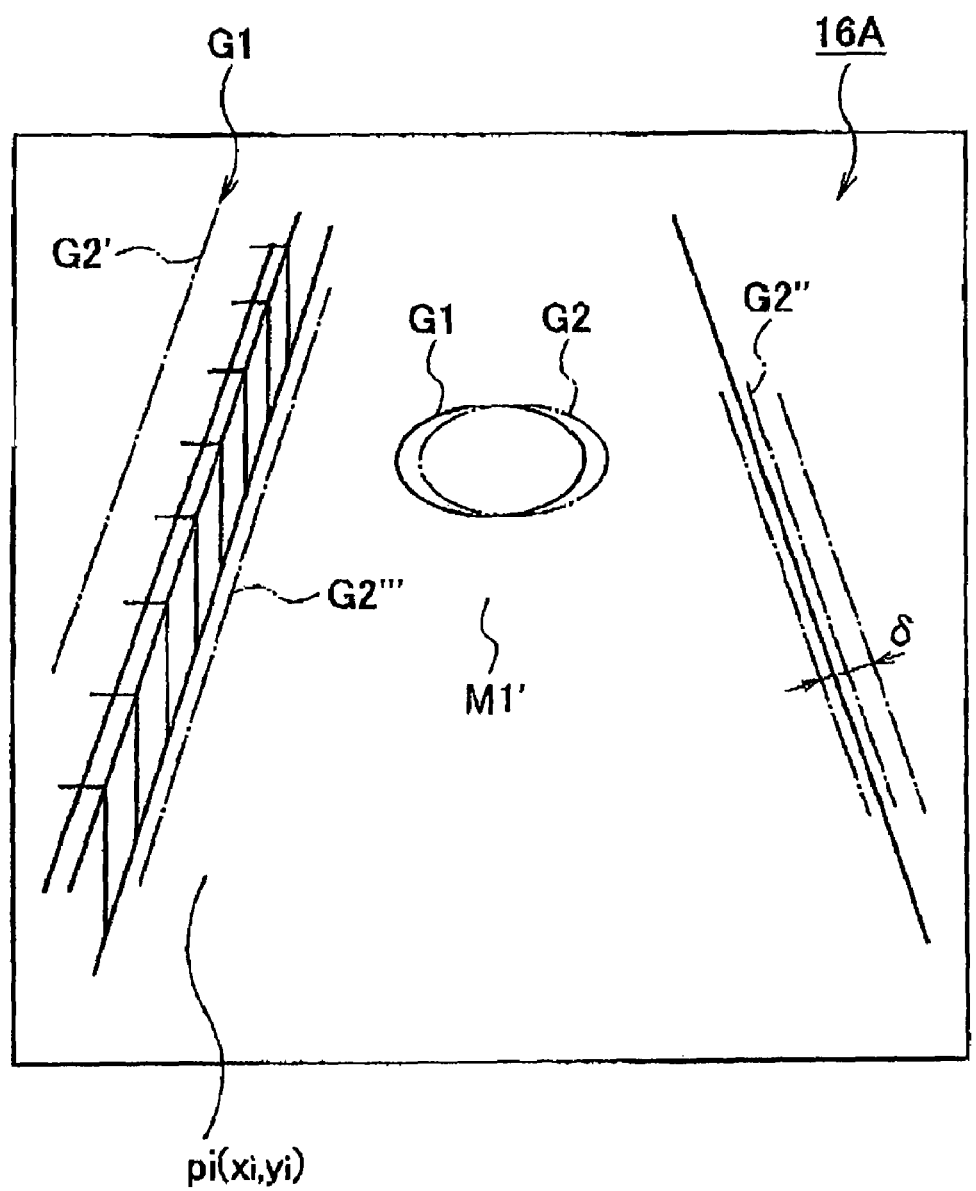
FIG. 5 is a diagram showing one example of the measurement object displayed on a screen of a displaying portion according to the present invention.

A real image G1, which corresponds to the measurement object 40 received as the image by the image sensor 20 through the telescope portion 14, is displayed on the screen 16A of the display 16 as, for example, shown in FIG. 5.

The CPU 30 is adapted to carry out various calculation processes based on control commands from the operation/input panel 15 or other commands, including a calculation-process for ranging and the image-creating processing of the measurement object.

Stored in the storing portion 36 is the design data "X" as construction-related data which correspond to the measurement object 40. The design data "X" are stored in the storing portion 36 in the form of three-dimensional data (xi', yi', zi') which are based on, for example, plane rectangular coordinates and height. The three-dimensional data (xi', yi', zi') are schematically shown in FIG. 4, corresponding to the measurement object 40.

The CPU 30 operates to obtain the models of the expected arrangement at completion of the objects G2, G2', G2" and G2'" which are expected to be seen from the known point A (X1, Y1, Z1), that is, from the electronically surveying apparatus 10 in the viewing direction M1 by calculation, based on the angle $\theta$ measured by the angle-measuring portion and the design data (xi', yi', zi'). The CPU displays the models of the expected arrangement at completion of the objects G2, G2', G2" and G2'" on the screen 16A of the display 16 in such a manner as to be overlapped with the real image G1, as shown in FIG. 5. Here, each of the models of the expected arrangement at completion of the objects G2, G2', G2" and G2'" are displayed on the screen 16A, linearly.

More specifically, since the position A (X1, Y1, Z1) at which the electronically surveying apparatus 10 is set is known, and the viewing direction M1 from the position A (X1, Y1, Z1) toward the measurement object 40 is also known, a position in the measuring object 40 where corresponds to a screen-center M1' of pixels Pi (xi, yi) of the screen 16A, which correspond to the design data (xi', yi', zi') in the screen 16A with respect to the design data (xi', yi', zi') in a map, can be specified. Thus, it is possible to display the models of the expected arrangement at completion of the objects G2, G2', G2" and G2'" on the screen 16A.

Meanwhile, when the viewing direction M1 is to be rotated, in other words, when the viewing direction M1 is to be changed, it is desired to sequentially display on the display (displaying portion) 16 the models of the expected arrangement at completion of the objects, which the CPU (arithmetic processing portion) 30 has calculated, based on detection of the horizontal angle-measuring portion 34 (angle-measuring portion) and the vertical angle-measuring portion 35 (angle-measuring portion) according to the changing of the viewing direction.

The embodiment of the present invention has been described in the foregoing. However, the CPU 30 may be configured to obtain the models of the expected arrangement at completion of the objects G2, G2', G2" and G2'" by calculation based on the distance ranged by the ranging portion 31 and the angle θ.

In addition, when the telescope portion 14 is provided with a zooming-optical system, the CPU 30 may be configured to zoom the models of the expected arrangement at completion of the objects and display them on the screen 16A of the display 16, such that sizes of the models of the expected arrangement at completion of the objects G2, G2', G2" and G2'" and a size of the measurement object 40 actually seen from the position. A (X1, Y1, Z1) are coincided to each other according to magnification of the zooming-optical system.

Furthermore, the CPU 30 may be configured to display the models of the expected arrangement at completion of the objects G2, G2', G2" and G2'" on the screen 16A, dottedly or linearly.

Also, the CPU 30 may be configured to calculate an allowable range δ with respect to the models of the expected arrangement at completion of the objects G2, G2', G2" and G2'" based on the design data, and to display lines for showing upper and lower limits of the allowable range δ on the screen 16A.

Meanwhile, the storing portion 36 may be provided to store the design data, and also positional information which represents the position A (X1, Y1, Z1) at which the electronically surveying apparatus 10 is set, including information on the height of the electronically surveying apparatus 10. In addition, the CPU 30 may be configured to calculate the models of the expected arrangement at completion of the objects based on the positional information of the electronically surveying apparatus 10, the angle between the reference direction and the viewing direction (aimed direction) which the angle-measuring portion has detected as the horizontal angle and the vertical angle, and the design data, and to display the calculated models of the expected arrangement at completion of the objects on the screen 16A of the display, directly or being overlapped with the real image.

In the embodiment as described above, although the models of the expected arrangement at completion of the objects are overlapped with the real image to be displayed on the screen, it is not necessarily required to display the real image. In such a case, it may be configured that the models of the expected arrangement at completion of the objects are only displayed on the screen according to the rotation of the viewing direction.

When only displaying the models of the expected arrangement at completion of the objects in the direction from the position A (X1, Y1, Z1) toward the aimed direction on the screen without overlapping them with the real image, the electronically surveying apparatus does not have to include the telescope portion or the imaging portion. In such a case, the electronically surveying apparatus suffices to be provided with the storing portion for storing the design data, the angle-measuring portion for electronically measuring the angle between the reference direction and the aimed direction, the arithmetic processing portion for calculating the models of the expected arrangement at completion of the objects, and the displaying portion for displaying the models of the expected arrangement at completion of the objects.

Because the models of the expected arrangement at completion of the objects are to be displayed on the screen and thus a finalized arrangement of the object in a construction work or the like can be imaged if the present invention having the structure described above is employed, it has an advantageous effect that slope stakes can be installed efficiently, for example.

According to the present invention structured as described in the foregoing, it is possible to confirm visually whether or not the measurement object is constructed according to the design data.

What is claimed is:

1. An electronic surveying apparatus, comprising:
   a storing portion configured to store positional data of a surveying apparatus body and design data as construction-related data;
   an angle-measuring portion configured to measure an aimed direction relative to a reference direction;
   an arithmetic processing portion configured to obtain a model of an expected arrangement at completion of an object which is expected to be seen from a position of the surveying apparatus body in the aimed direction by calculation, based on the aimed direction measured by the angle-measuring portion, said design data and the positional data of the surveying apparatus body; and
   a displaying portion configured to display said model of the expected arrangement at completion of the object obtained by the calculation with the arithmetic processing portion,
   wherein said arithmetic processing portion is configured to display, according to a change in the aimed direction, said model of the expected arrangement at completion of the object relative to the changed aimed direction on the displaying portion based on detection of said angle-measuring portion.

2. The electronic surveying apparatus according to claim 1, further comprising a telescope portion for viewing an object to be measured which corresponds to said expected arrangement at completion of the object, and an imaging portion configured to image the measurement object viewed by the telescope portion,
   said aimed direction being a viewing direction, wherein
   said displaying portion is configured to display the measurement object imaged by said imaging portion as a real image of the measurement object, and
   said arithmetic processing portion is configured to display said model of the expected arrangement at completion of the object on the displaying portion, directly or by overlapping said model of the expected arrangement at completion of the object with said real image obtained by the imaging portion through the telescope portion.

3. An electronic surveying apparatus, comprising:
   a telescope portion for viewing an object to be measured;
   an imaging portion configured to image the measurement object in an aimed direction viewed by the telescope portion;
   a displaying portion configured to display the measurement object imaged by said imaging portion as a real image of the measurement object;
   a storing portion configured to store positional data of a surveying apparatus body and design data as construction-related data;
   an angle-measuring portion configured to measure the aimed direction relative to a reference direction; and
   an arithmetic processing portion configured to obtain a model of an expected arrangement at completion of an object which is expected to be seen from a position of the surveying apparatus body in the aimed direction by calculation, based on the aimed direction measured by the angle-measuring portion, said design data and the positional data of the surveying apparatus body;

wherein the arithmetic processing portion is configured to display said model of the expected arrangement at completion of the object obtained by the calculation of the arithmetic processing portion on the displaying portion, and wherein the arithmetic processing portion is configured to display said model of the expected arrangement at completion of the object on the displaying portion by overlapping said model of the expected arrangement at completion of the object with said real image obtained by the imaging portion through the telescope portion.

4. The electronic surveying apparatus according to claim 1, wherein said arithmetic processing portion is configured to calculate, based on the positional data of the surveying apparatus body including height thereof, the aimed direction which the angle-measuring portion has detected as a horizontal angle and a vertical angle, and the design data, said model of the expected arrangement at completion of the object expected to be seen from the position including the height of the surveying apparatus body, and display said calculated model of the expected arrangement at completion of the object on the displaying portion.

5. The electronic surveying apparatus according to claim 1, further comprising a ranging portion configured to range a distance from the surveying apparatus body to said measurement object, wherein said arithmetic processing portion is configured to calculate said model of the expected arrangement at completion of the object based on the distance ranged by said ranging portion, the aimed direction measured by the angle-measuring portion, said design data and the positional data of the surveying apparatus body.

6. The electronic surveying apparatus according to claim 1, wherein said arithmetic processing portion is configured to zoom said model of the expected arrangement at completion of the object and display the zoomed model of the expected arrangement at completion of the object on the displaying portion according to magnification when the magnification of the telescope portion is variable.

7. The electronic surveying apparatus according to claim 1, wherein said arithmetic processing portion is configured to calculate an allowable range with respect to said model of the expected arrangement at completion of the object based on said design data, and display the allowable range on said displaying portion by overlapping the allowable range with said model of the expected arrangement at completion of the object.

8. The electronic surveying apparatus according to claim 3, wherein said arithmetic processing portion is configured to display, according to a change in the aimed direction, said model of the expected arrangement at completion of the object relative to the changed aimed direction on the displaying portion based on detection of said angle-measuring portion.

9. The electronic surveying apparatus according to claim 3, wherein said arithmetic processing portion is configured to calculate, based on the positional data of the surveying apparatus body including height thereof, the aimed direction which the angle-measuring portion has detected as a horizontal angle and a vertical angle, and the design data, said model of the expected arrangement at completion of the object expected to be seen from the position including the height of the surveying apparatus body, and display said calculated model of the expected arrangement at completion of the object on the displaying portion.

10. The electronic surveying apparatus according to claim 3, further comprising a ranging portion configured to range a distance to said measurement object, wherein said arithmetic processing portion is configured to calculate said model of the expected arrangement at completion of the object based on the distance ranged by said ranging portion, the aimed direction measured by the angle-measuring portion, said design data and the positional data of the surveying apparatus body.

11. The electronic surveying apparatus according to claim 3, wherein said arithmetic processing portion is configured to zoom said model of the expected arrangement at completion of the object and display the zoomed model of the expected arrangement at completion of the object on the displaying portion according to magnification when the magnification of the telescope portion is variable.

12. The electronic surveying apparatus according to claim 3, wherein said arithmetic processing portion is configured to calculate an allowable range with respect to said model of the expected arrangement at completion of the object based on said design data, and display the allowable range on said displaying portion by overlapping the allowable range with said model of the expected arrangement at completion of the object.

13. An electronic surveying apparatus, comprising:
a telescope portion for viewing an object to be measured;
an imaging portion configured to image the measurement object in an aimed direction viewed by the telescope portion;
a displaying portion configured to display the measurement object imaged by said imaging portion as a real image of the measurement object;
a storing portion configured to store positional data of a surveying apparatus body and design data as construction-related data;
an angle-measuring portion configured to measure the aimed direction relative to a reference direction; and
an arithmetic processing portion configured to obtain a model of an expected arrangement at completion of an object which is expected to be seen from a position of the surveying apparatus body in the aimed direction by calculation, based on the aimed direction measured by the angle-measuring portion, said design data and the positional data of the surveying apparatus body, wherein the arithmetic processing portion is configured to display said model of the expected arrangement at completion of the object obtained by the calculation of the arithmetic processing portion on the displaying portion, and wherein the arithmetic processing portion is configured to display said model of the expected arrangement at completion of the object on the displaying portion according to a change in the aimed direction based on detection of said angle-measuring portion.

14. The electronic surveying apparatus according to claim 13, wherein said arithmetic processing portion is configured to calculate, based on the positional data of the surveying apparatus body including height thereof, the aimed direction which the angle-measuring portion has detected as a horizontal angle and a vertical angle, and the design data, said model of the expected arrangement at completion of the object expected to be seen from the position including the height of the surveying apparatus body, and display said calculated model of the expected arrangement at completion of the object on the displaying portion.

15. The electronic surveying apparatus according to claim 13, further comprising a ranging portion configured to range a distance to said measurement object, wherein said arithmetic processing portion is configured to calculate said model of the expected arrangement at completion of the object based on the distance ranged by said ranging portion, the aimed direction measured by the angle-measuring portion, said design data and the positional data of the surveying apparatus body.

16. The electronic surveying apparatus according to claim 13, wherein said arithmetic processing portion is configured to zoom said model of the expected arrangement at completion of the object and display the zoomed model of the expected arrangement at completion of the object on the displaying portion according to magnification when the magnification of the telescope portion is variable.

17. The electronic surveying apparatus according to claim 13, wherein said arithmetic processing portion is configured to calculate an allowable range with respect to said model of the expected arrangement at completion of the object based on said design data, and display the allowable range on said displaying portion by overlapping the allowable range with said model of the expected arrangement at completion of the object.

* * * * *